July 4, 1950 A. H. GFRORER 2,513,718
POWER ACTUATED ELEVATING TRUCK
Filed Dec. 6, 1946 5 Sheets-Sheet 1

Inventor:
Albert H. Gfrorer,
By Heard Smith & Tennant
Attorneys

July 4, 1950 A. H. GFRORER 2,513,718
POWER ACTUATED ELEVATING TRUCK
Filed Dec. 6, 1946 5 Sheets-Sheet 3

July 4, 1950  A. H. GFRORER  2,513,718
POWER ACTUATED ELEVATING TRUCK
Filed Dec. 6, 1946  5 Sheets-Sheet 4

Inventor:
Albert H. Gfrorer
by Heard Smith & Tennant
Attorneys

Patented July 4, 1950

2,513,718

UNITED STATES PATENT OFFICE 2,513,718

POWER ACTUATED ELEVATING TRUCK

Albert H. Gfrorer, Bernardsville, N. J., assignor to Lewis-Shepard Company, Watertown, Mass., a corporation of Massachusetts Application December 6, 1946, Serial No. 714,599

17 Claims. (Cl. 180—65)

This invention relates to improvements in motor driven trucks and the principal object of the invention is to provide controlling mechanisms conveniently located with respect to the hand or hands of the operator when guiding or otherwise manipulating the truck mechanisms which will enable him more efficiently to guide the truck and to control the operations thereof.

More specifically the invention relates to improvements in elevating trucks having upwardly and downwardly movable load supporting means adapted to be introduced beneath a load-bearing skid or into a pallet with selectively operable controlling means located upon the steering mechanism within the range of a hand of the operator to control the operation of the truck including the mechanism for raising and lowering the load supporting means.

In the operation of trucks of this character the loaded or unloaded truck is often required to pass through narrow aisles requiring abrupt turns to position the truck properly to loading and unloading positions and during the transportation of the load the truck is frequently required to travel over up and down inclined surfaces. The purpose of the present invention is to enable the operator with a minimum of effort to control the driving of the truck as a desired speed, to position it properly into loading or unloading position and to enable the operator to control the raising and lowering of the load supporting means while grasping, or in a position to grasp, the hand grip of the steering mechanism, thereby facilitating the full operation of the truck and avoiding inconvenience in the manipulation of the truck and its load supporting means, which in usual power driven trucks requires separate operations of the steering mechanism and the mechanism for controlling the speed of the truck from that which operates the load supporting means.

Another object of the invention is to provide a power driven truck having a steering head rotatable about a vertical axis provided with a traction wheel and a reversible motor for driving the traction wheel and a base mounting upon the steering head and having a tongue mounted on the steering head to swing vertically, with hand-gripping means at the end thereof, and switch mechanism mounted upon the end of the tongue in proximity to the hand-gripping means operable by a hand of the operator while grasping the hand-gripping means for controlling electric circuits leading from a suitable source of power carried by the truck and thereby to regulate the speed of the motor while being steered in any direction.

A further object of the invention is to provide switch mechanisms for the electric circuit of the driving motor and brake located in proximity to the hand-gripping means and operable by the hand of the operator while grasping the gripping means to control the operation of the brake.

Another object of the invention is to provide a power driven truck, having a vertically movable swinging tongue and upwardly movable load supporting means with an electrically operated pump and hydraulic lifting means operable thereby to raise and lower the load supporting means, with switch mechanism which is mounted upon the tongue in proximity to the hand-gripping means thereof for controlling the raising and lowering of the load supporting means, whereby the operator while still grasping the hand-gripping means and applying the brake to the driving means can raise or lower the load supporting means, thus enabling the operator to maintain the truck in proper position during the loading or unloading of a skid or pallet bearing the load upon the load supporting means.

In brief the invention is designed to enable an operator of a power driven elevating truck fully to control the operation of the truck during the loading and unloading thereof and the manipulation of the truck during its transportation while in a position to guide the truck or maintain it stationary during the loading and unloading operation and irrespective of the position of the vertical swinging tongue, it being the purpose of the present invention to provide a construction in which all the controls are compactly assembled into switch mechanism at the end of the steering tongue as distinguished from prior power actuated trucks which require special mechanism to control the steering of the truck, the application of power to the driving mechanism and/or the brake mechanism, and separate manually operable mechanisms for raising and lowering the load supporting means which require the operator to divert his attention from the steering tongue in order to operate the load supporting means.

Another object of the invention is to provide a mounting for the steering head assembly which can be readily removed as a unit for service with a few minutes' work.

Another object of the invention is to provide novel means for mounting upon the truck a power lift and release assembly wherein an electric motor, hydraulic pump, valves, etc., are all compactly arranged into one unit which can be detached for service by removing one or more bolts.

Another object of the invention is to provide a steering assembly with a hollow steering post to eliminate collector rings for conducting electric currents to members of the steering assembly and the switch mechanism mounted upon the end of the tongue and which will permit the steering tongue to be moved to any steering position.

These and other objects and features of the invention will more fully appear from the following description and the accompanying drawings and will be particularly pointed out in the claims.

Preferred embodiments of the invention are illustrated in the accompanying drawings, in which.

Fig. 7 is a detail transverse sectional view, mainly in vertical section, of the steering head, the traction wheel supporting the same and the motor and brake mechanism which is mounted upon the steering head;

Figure 1:
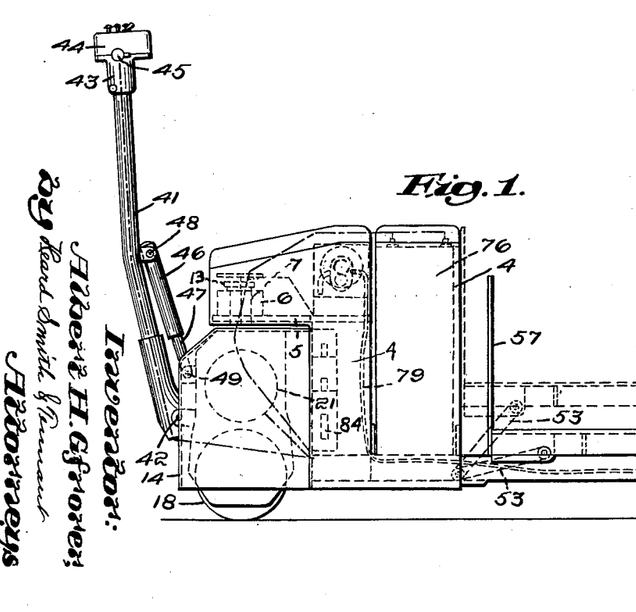
Fig. 1 is a side elevation of a power driven truck embodying the invention having load supporting means connected by parallel links to a main frame with hydraulically operable means for moving the load supporting means upwardly and downwardly in parallelism with the frame.
Figure 2:
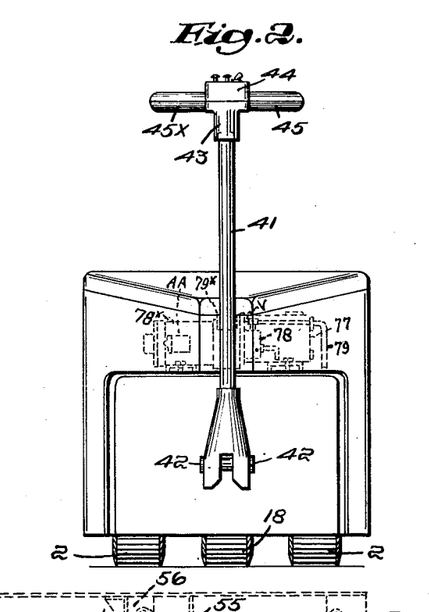
Fig. 2 is a front end elevation of the truck illustrated in Fig. 1.

The truck illustrated in Figs. 1 and 2 comprises a main frame having a pair or pairs of parallel side bars 1, rear wheels 2 mounted upon an axle 3 extending transversely from the side bars 1, or axles extending between pairs of parallel side bars for an open end truck as the case may be, a rigid framework forming a standard 4 preferably of welded fabricated construction and welded to and extending upwardly from front end portions of the respective side bars.

The framework 4 has welded to its upper end a forwardly extending thick rigid plate 5 having at its front end an upwardly extending boss or collar 6 welded thereto in which the cylindrical tubular steering post 7 of the steering assembly is mounted to rotate about a vertical axis. The steering post 7 is provided with a lower flange 8 which engages the inner race 9 of a preferably conical roller bearing, the outer race 10 of which desirably is seated in a counterbored recess in the under face of the plate 5. The upper end of the boss or ring 6 is provided with a counterbore in which is seated the lower race 11 of a complementary roller bearing, the upper race 12 of which is fixedly mounted upon a shouldered end portion of the steering post 7 and is releasably held in engagement therewith by a nut 13 which upon removal will enable the steering post assembly to be quickly detached as a unit for service.

The steering head 14 comprises a horizontal plate section 15 through which the lower end of the steering post extends beyond and to which the flange 8 of the steering post is welded. A vertical plate section 16, which is integral with the plate section 15, extends downwardly therefrom and has mounted upon it a motor and suitable power transmitting mechanism for driving the steering wheel.

The lower end portion of the plate 16 has an integral laterally extending cylindrical portion 17 forming a support for the steering and traction wheel 18 which surrounds the extension and preferably is provided with a rubber or other resilient tire 19. The axle 20 of the traction wheel is mounted in suitable antifriction bearings interposed between it and the respective end portions of the cylindrical extension 17 of the vertical plate 16. The motor, preferably in the form of an electric motor 21, is mounted upon one side of the vertical plate 16 and the motor shaft 22 extends through an oil seal 23 in the plate 16 and is journaled in an antifriction bearing 24 in the wall of the housing 25 which is secured to the vertical plate 16. The means for driving the steering and traction wheel from the shaft 22 of the motor, as illustrated herein, comprises a train of reducing gears of suitable dimensions. The motor shaft 22 is provided at its end with a brake drum 26 and brake shoes 27 which partially surround diametrically opposite portions of the brake drum. The brake shoes are pivotally mounted upon studs 28 in upwardly extending arms 29 of the housing 25. The brake shoes are provided with complementary upwardly extending arms 30 and an adjusting bolt or bolts 31 which extend through the arms 30 provide assembly mountings for a spiral spring 32 which normally tends to spread apart the arms 30 and to force the brake shoes into engagement with the brake drum 26 and thereby brake the rotation of the motor shaft and its armature. The fact that the brake linings will wear in service has been recognized and compensation for such wear can be readily accomplished by adjustment of the nuts upon the bolt or bolts 31.

Electrically operable means are provided for releasing the brake which, as illustrated herein, comprises a pair of toggle links 33 the outer ends of which are respectively connected by a pivot 34 and a vertical link 34x to the armature 35 of a solenoid 36 which is mounted upon a suitable bracket 36x which is adjustably secured to the housing 25 to permit vertical positioning of the solenoid.

Inasmuch as more force is required to actuate the toggle to release the brake shoes from the brake drum than that which is necessary to cause the toggle when wholly or partially straightened to retain the brake shoes out of engagement with the brake drum during the driving of the truck, means are provided for reducing the electric current supplied to the solenoid. In the construction illustrated the armature of the solenoid extends through a slot in a horizontal arm 37 of an L-shaped lever and is provided with a member 38 which overlies the slot and is adapted to engage the upper side of the lever arm 37. The other arm 39 of the L-shaped lever extends vertically downwardly and at its lower end engages and operates a switch 40 of a rheostat in the circuit for supplying electric current to the solenoid operable upon actuation of the solenoid first to supply heavy current thereto to cause the toggle to release the brake shoes from the brake drum and thereafter to reduce the currents consumed by the solenoid while holding the brake in released position during the driving of the truck and at the same time providing sufficient current to hold the brake shoes out of engagement with the brake drum. Inasmuch as such solenoid controlling mechanism is well known no detail description thereof is necessary.

Suitable means are provided for rotating the steering head assembly about the vertical axis of the steering post to guide the truck with controlling means associated with the steering mechanism always conveniently within the reach of the operator for controlling the speed of the motor, the brake, the raising and lowering of the load supporting means and horn or other signaling mechanism as hereinafter described.

In the particular embodiment of the invention illustrated herein a tubular steering tongue 41 is pivotally mounted at its lower end upon brackets 42 extending forwardly from the steering head and has secured to its upper end a sleeve 43 provided with a switch box 44 containing closely assembled mechanisms for controlling all of the operations of the truck. The switch box has laterally extending hand grips 45 upon one or both of which is mounted mechanism adapted to be actuated by the hand or hands of the operator while grasping a hand grip to position the switch mechanism in such manner as to control electric circuits for supplying currents to the motor which drives the steering and traction wheel and to the braking mechanism therefor, other switch mechanism being contained in the switch box readily accessible to the operator while grasping a hand grip for controlling the mechanism for raising and lowering the load supporting means and the signaling mechanism when the tongue is in any position, thereby saving the time of the operator which would otherwise be consumed if he were required to move from one position to another to control or operate the respective mechanisms.

Figure 3:
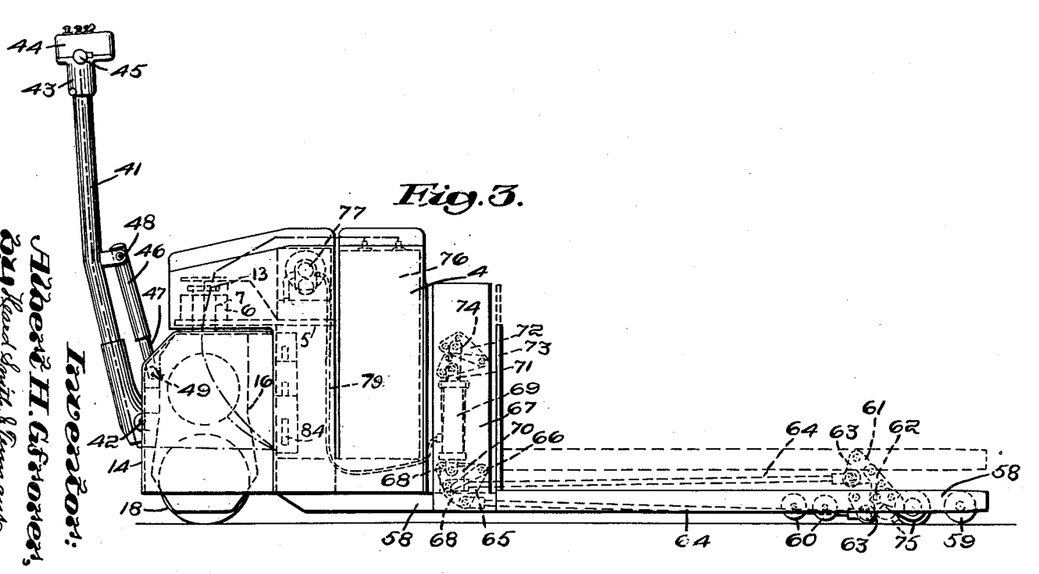
Fig. 3 is a side elevation of a pallet elevating truck having hydraulically operable lifting means for raising the load supporting means substantially vertically.
Figure 8:
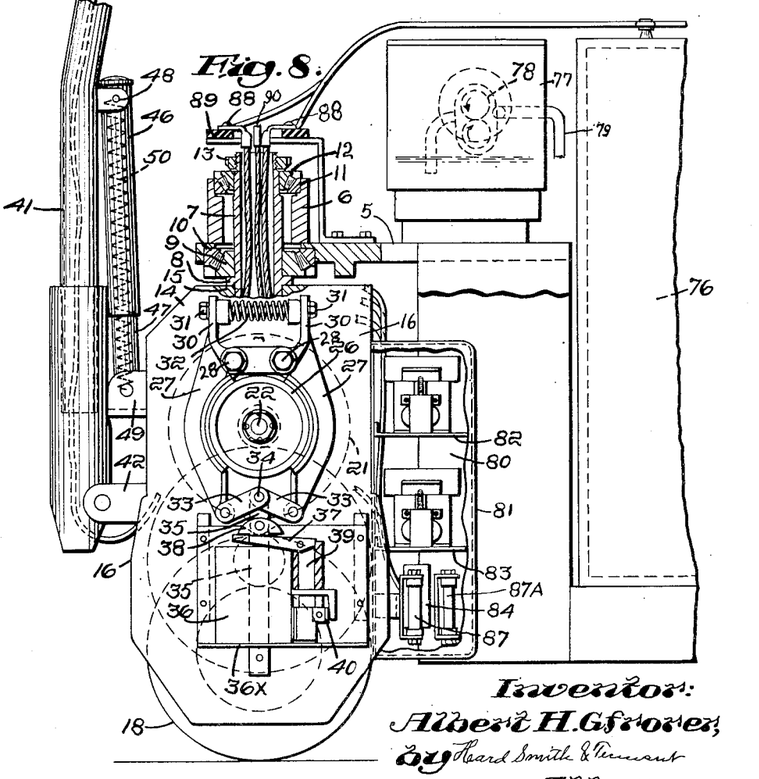
Fig. 8 is a detail view, partially in longitudinal vertical section, illustrating the manner in which the steering head is mounted upon the standard of the main frame, the tongue pivotally mounted upon the steering head, and also broken away to illustrate the electrical relays and resistor in the several circuits leading to the motors and brake mechanisms for controlling the operation of the driving mechanism and the mechanism for raising and lowering the load supporting means.

Means are provided for so balancing the tongue as to hold it stationary in any position to which it may be swung either in a horizontal or vertical direction. The tongue balancing means comprises upper and lower telescoping tubular members 46 and 47 pivoted at their respective ends upon brackets 48 and 49 mounted respectively upon the tongue and the steering head as shown in Figs. 1, 3, and 8. A spiral spring 50, which is enclosed in the telescoping members 46 and 47, and connected respectively to pins extending through the brackets 48 and 49, provides means for so balancing the tongue as to hold it stationary in any position to which it may be swung in a vertical arc, including the upright position shown in Figs. 1, 3, and 8.

Upwardly and downwardly movable load supporting means are mounted upon the frame of the truck and hydraulically operable means is provided for raising and lowering the load supporting means. Typical constructions of the load supporting means are illustrated in Figs. 1 and 3 respectively. In the construction shown in Fig. 1 the load supporting means comprises parallel side bars 51 extending in parallelism with and in close proximity to the outer surface of the side bars 1 of the main frame, the side bars of the load supporting means being adapted to be lowered so that their upper surfaces are substantially flush with the upper surfaces of the side bars of the main frame as is usual in elevating truck constructions.

In the construction shown in Fig. 1 parallel links 52 and 53 are pivotally connected at their upper and lower ends to the load supporting means and the main frame, the links 52 preferably being pivotally mounted upon the axle 3 of the rear wheels 2. An hydraulic jack, or pair of jacks, is provided for raising and lowering the load supporting means and comprises a cylinder, or cylinders 54 which are preferably pivotally mounted upon the rear axle 3 of the truck and the piston rod 55 of the jack or jacks is pivotally connected to a cross girder or girders 56 of the load supporting means approximately midway of the length thereof.

Suitable means, preferably an electrically operated pump, is provided for supplying fluid under pressure to the hydraulic jack or jacks as will hereinafter more fully appear. It will be understood that the load supporting means illustrated in Fig. 1 may be in the form of a single rectangular skeletonized platform or an open-ended construction in which the side frames and load supporting means comprises two parallel constructions spaced apart throughout their effective length and connected at their front end by a suitable vertical plate or standard 57 forming a dash board to limit the distance forwardly upon which the load may be piled upon the load supporting means.

A modified form of the invention is illustrated in Fig. 3 as applied to a pallet truck in which the load supporting means comprises spaced pairs of parallel side frames 58 with a series of rollers 59 and 60 assembled in their rear ends and with a lever 61 pivotally mounted upon the side bars 58 between the rollers 59 and the rollers 60, the lever 61 being of generally triangular form and pivoted upon a suitable shaft 62 mounted in the side frames 58. The lever 61 has a downward extension 63 to which is adjustably connected a pull rod 64 the forward end of which is pivotally connected near the lower apex of a triangular link 65 which is pivoted upon a shaft 66 in the supplemental standard 67 mounted upon the side bars 58. The forward apex of the triangular lever 65 is pivotally connected by a shaft 68 to the front end of the load supporting means. A vertical hydraulic jack 69 is pivotally mounted at its lower end upon a cross girder 70 within the standard 67 and the piston 71 of the hydraulic jack is pivotally connected to a triangular lever 72 fulcrumed upon the shaft 73 in the standard 67. A link 74 connects the lever 72 to the upper corner of the lever 65.

Suitable means are provided for supplying liquid under pressure to the hydraulic jack preferably from a pump as will hereinafter be more fully described. When pressure is supplied to the pump its piston will be raised thereby raising the link 74 and swinging the link 65 about its fulcrum 66 thereby drawing the rod 64 forwardly and rocking the lever 61 around its fulcrum 62. The lever 61 is provided at its lower end with a roller 75 which as the lever 61 is swung about its pivot 62 will be drawn forwardly thereby depressing the roller 75 and consequently raising the load supporting means to the position illustrated in dotted lines in Fig. 3. In each of the constructions hydraulic mechanisms are provided for raising and lowering the load supporting means and differ from each other mainly in the application of the invention to usual forms of elevating trucks and pallet trucks, it being recognized that the different forms of parallel link mechanisms for raising the load supporting means relatively to the main frame is old in the art except for the mechanism for actuating the hydraulic lifting means.

In each of the forms of trucks illustrated in Figs. 1 and 3 a space is provided rearwardly of the vertical framework 4 and the front end of the load supporting means to receive suitable storage batteries 76 which desirably but not necessarily may be enclosed in a suitable housing.

In each of these constructions the thick plate 5, which is mounted upon the upper end of the framework 4, extends forward a sufficient distance to provide a space therebeneath in which the steering assembly may be rotated about its vertical axis to any steering position without engaging the framework 4.

In each of these constructions an electric pump unit and a motor for operating the same is mounted upon the rear portion of the thick plate 5 which is supported by the framework 4 and detachably connected by bolts to the plate 5 in such manner as to be readily removed therefrom. The pump unit 77 comprises a reservoir containing liquid, preferably oil, the gear pump 78 driven by an electric motor 78x, and suitable valve mechanism for controlling the supply of fluid under pressure through a flexible conduit 79 to the hydraulic jack 54 in the construction shown in Fig. 1 or to the vertical hydraulic jacks 69 shown in Fig. 3, as the case may be.

Suitable valve mechanism, which preferably is located within the pump unit, is provided for releasing the fluid pressure supplied to the respective jacks and such valve mechanism desirably is electrically controlled by a solenoid 79x which, as illustrated in Fig. 2, is located between the pump actuating motor and the pump unit.

Inasmuch as the steering assembly with its vertically swinging tongue is rotatable about the vertical axis of the steering post, it is desirable that the conductors for supplying suitable power circuits from the storage battery to the motor for driving the steering and traction wheel and to the brake mechanism respectively shall be so arranged as to avoid undesirable flexing as the steering assembly is rotated about its vertical axis to steer the truck.

It is also desirable to provide a construction in which supplemental circuits for controlling the power circuits and other electric circuits lead from the storage battery through the respective switches which are contained in the casing 44 which is mounted upon the end of the tongue and which will not be subjected to undue flexure during the steering of the truck.

These desirable features are accomplished in the present invention by providing suitable cables for heavy power currents leading from the storage battery through the tubular steering post to the relays for controlling the current supplied to the driving motor, and to the relays controlling the power currents supplied respectively to the pump motor and the electric circuit leading to a signaling device.

In the construction shown a cabinet 80, which is fixedly mounted upon the back plate of the steering head assembly, has a removable cover 81 and is provided with an upper shelf 82 and a lower shelf 83 upon which are mounted the relays for controlling the electric circuits hereinafter described and in the lower part of the cabinet is provided with a terminal board 84 having a lower bank of terminals 85 to certain of which the conductors leading from the battery are detachably connected and from which the respective power currents lead through the relays to other terminals in the lower bank and thence respectively to the motor which drives the traction wheel, the brake controlling solenoid, and the pump which actuates the hydraulic lifting mechanism. The terminal board 84 is also provided with an upper bank of terminals 86 to certain of which smaller conductors for controlling currents leading from the storage battery are respectively connected with circuits leading therefrom to the respective relays and thence to other terminals in the upper bank and from the latter through the tongue to the switch mechanisms which are mounted upon the ends of the tongues. A suitable resistor 87 in one of the circuits for the power current which operates the driving motor is mounted in the lower compartment, as illustrated in Fig. 8. An auxiliary resistor 87—A commonly known as an "anti-plugging" resistor is also mounted in the lower compartment.

The purpose of the terminal board thus equipped is to enable each of the conductors for the several circuits to be made in sections which can be conveniently assembled and removed for replacement if necessary. While in the construction illustrated in the drawings the relays are shown as being mounted upon shelves in the cabinet they, as well as the panel board, may obviously be suitably secured to one of the walls of the cabinet.

In order to avoid twisting or undue flexure of the cables leading from the storage battery to the terminals of the terminal boards, the cables containing conductors for the power current lead from the storage battery 76 to diametrically oppositely positioned terminals 88 suitably mounted upon an insulating plate 89 supported by a bracket extending upwardly from the plate 5 and having an aperture therethrough in alinement with the tubular passage through the steering post. The cables containing conductors forming extensions of the power cables lead from the terminals 88 downwardly through the steering post to the respective terminals of the panel board. The supplemental cables containing the conductors for the controlling circuits also lead from the storage battery to similar terminals 90 on the insulating plate 89 preferably positioned at right angles to the terminals 88 and therefrom downwardly through the tubular steering post to the upper bank of terminals of the terminal board. By reason of this construction the steering head may be rotated about the vertical axis of the steering post in any steering position without harmful flexing or twisting of the cables.

Figure 9:
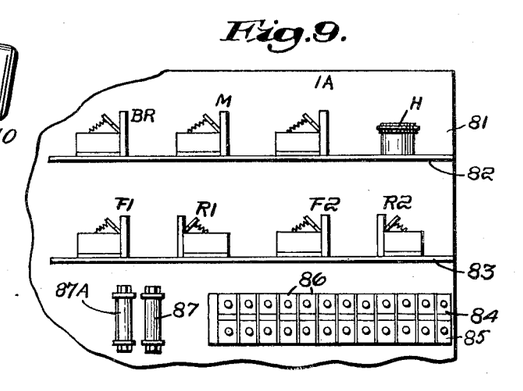
Fig. 9 is a diagrammatic view illustrating the several switch mechanisms and a terminal board which is mounted within the casing containing the relays and resistor; and, Fig. 10 is a diagrammatic view of the electric circuits and the controlling mechanisms therefor, in which the upper portion of the figure illustrates the power circuits for actuating the driving motor and the lower portion the circuits which are controlled by the switch mechanism in the switch box at the end of the tongue.

The positions of the several relays upon the upper shelf, which are graphically illustrated in Fig. 9, comprise a relay for the brake circuit which is indicated by the letters BR, the relay which controls the main circuit of the driving motor which is indicated by the letter M, the relay for shunting the resistance in the power circuit supplied to the driving motor for controlling the speed of the truck which is indicated by the letter I—A, and the connection of the circuit which leads to the horn by the letter H.

The relays upon the lower shelf of the cabinet are indicated respectively by the letters F1, R1, F2, R2, the relays F1, R1, and F2, R2, being respectively interconnected in such manner that the current leading to the relays F1, F2, can alone be operated when the driving motor is rotated in a direction to cause the truck to move forwardly and the relays R1, R2, operated only when the driving motor is rotated in a direction to cause the truck to move rearwardly.

Figure 4:
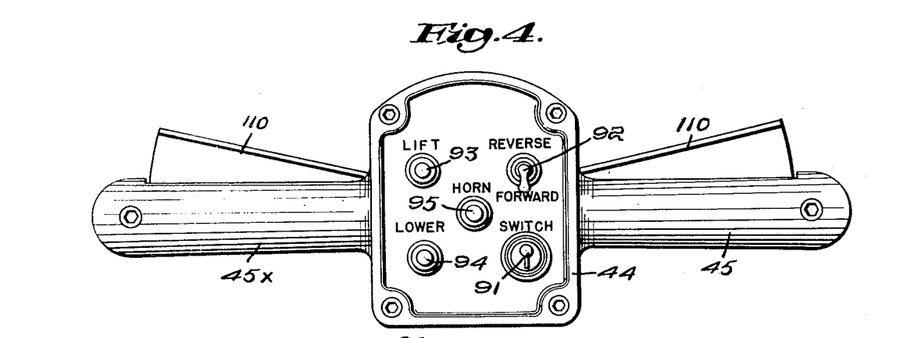
Fig. 4 is a plan view of the switch mechanism mounted upon the end of the tongue having hand grips extending laterally therefrom and provided with lever mechanism for controlling the operation of the driving mechanism and including means for controlling the circuits to the mechanism for raising and lowering the load supporting means and circuit to a signaling device and a lock switch for controlling all the electric circuits.
Figure 5:
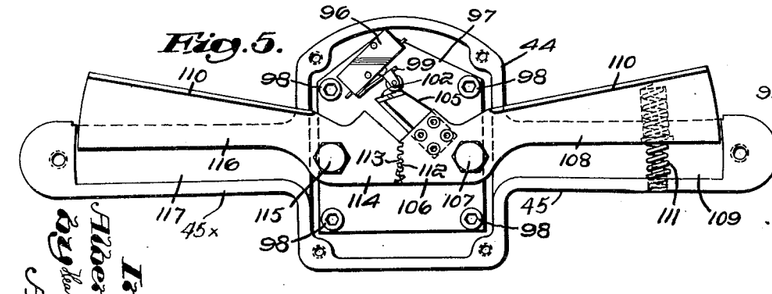
Fig. 5 is a view of the switch construction illustrated in Fig. 4 in which the switch cover and parts of the hand grips extending therefrom are removed to show articulated portions of the switch mechanism.
Figure 6:
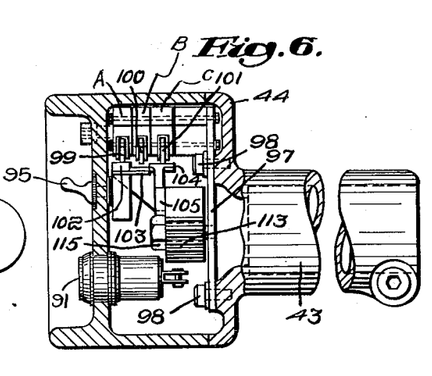
Fig. 6 is a detail view mainly in vertical median section illustrating particularly the switch mechanism for controlling the speed of the truck and the brake therefor.

The preferred form of switch mechanism embodying the present invention, which is illustrated in detail in Figs. 4, 5, and 6, as contained in the switch box 44, comprises a key lock switch 91 in the supply to all the electric circuits which pass through the switch box including control switch for brake solenoid operating coil, and, through reversing switch 92, the control coils of the relays for causing the driving motor selectively to rotate the traction wheel in a direction to drive the truck forwardly or in the reverse direction to drive the truck rearwardly, a preferably push button switch 93 for controlling the relay for the circuit which actuates the pump motor to cause the hydraulic jack to lift the load supporting means, a preferably push button switch 94 which controls an electric circuit to a solenoid which actuates a relief valve to release fluid from the lifting jack motor to permit the load supporting means to descend; and a push button switch 95 in the circuit leading to the horn or other signaling device.

The switch box also contains suitable switch mechanism operable after the key switch 91 is closed by the hand of the operator and while grasping a hand grip, to control the supplemental circuits leading to the respective relays which control the supply of power currents to the brake solenoid and the motor which drives the traction wheel. These comprise three switches A B and C which as shown are mounted upon a suitable support 96 which is mounted upon a plate 97 fixedly secured to the wall of the switch box 44 by bolts 98. The switches are interposed respectively in the controlling circuits leading from the battery to the relays which control the brake solenoid circuit, and the directional circuits, the driving motor circuit leading through the resistor in the power circuit for actuating the driving motor at low speed, and a shunt circuit for cutting out the resistor to drive the truck at full speed. These switches as shown in Figs. 5 and 6 comprise resilient arms 99, 100, and 101 having respectively at their free ends suitable means, such as rollers adapted respectively to be engaged by cams 102, 103, 104, carried by a bracket 105 which is mounted upon an arm 106 of a lever which is fulcrumed upon a stud 107 projecting from the plate 97.

Conductors lead from the switches A, B and C, to the respective relays which control the brake releasing solenoid and those which control the current supplied to the driving motor. The other arm 108 of the lever, which is flat, extends outwardly from the switch box into a slot 109 in the hand grip 45. The upper edge of the arm 108 is provided with a relatively wide preferably rounded flange 110 adapted to be engaged by the hand of the operator when grasping the hand grip 45. A spiral spring 111, which is interposed between the bottom of the slot 109 and the flange 110, normally raises the arm 108 and holds the cams 102, 103, 104 out of effective engagement with the resilient switch members 99, 100, 101.

Desirably similar lever mechanism for actuating the switches extends into the diametrically opposite hand grip in order that the said switches may be actuated by either hand of the operator. To accomplish this purpose the end of the lever arm 106 is provided with suitable means such as gear teeth 112 which engage complementary gear teeth 113 upon the end of the inner arm 114 of a complementary lever which is fulcrumed upon a stud 115 extending from the plate 97, the other arm 116 of the lever extending outwardly into a slot 117 in the other hand grip 45x.

By reason of this construction the operator may by depressing either arm 108, or 116, of the respective levers, cause the actuation of the cams controlling the switch mechanisms in the circuits which supply power to the driving motor, thereby enabling the operator to control the speed of the truck by the gripping movement of either hand. The cams 102, 103, and 104, are of arcuate form, the cam 102 being of sufficient length when engaged with the roller of the switch arm 99 to complete the relay circuit which controls the power circuit to the brake releasing solenoid 36, thereby to release the brake and to maintain the circuit complete and the brake released so long as the lever 108 continues to be depressed. This operation of the cam 102 also conditions the circuits to the relays which control the power circuits from the battery to the reversible motor which drives the traction wheel.

Further depression of the lever 108 causes the relatively short cam 103 to engage the roller upon the switch arm 100 of the controlling circuit of the relay for the power circuit to the motor, which contains the resistor, 87, and which drives the traction wheel at a slow speed.

Still further depression of the lever 108 causes the cam 104 to complete a shunt circuit around the resistor 87 to supply a full power current to the reversible motor to drive the traction wheel at high speed.

Upon successive release of pressure by the operator on the lever 110 reverse operation takes place, the speed of the traction wheel being successively reduced and when pressure is fully released separation of the cam 102 from the switch arm 99 and application of the brake by the spring 32 as heretofore described.

Inasmuch as the lever 116 in the other hand grip 45x is interengaged within the switch box with the adjacent end of the lever 108 by the gears 113 and 112, gripping pressure of the hand of the operator on the lever 116 will similarly operate the switches which control the driving of the traction wheel.

Figure 10:
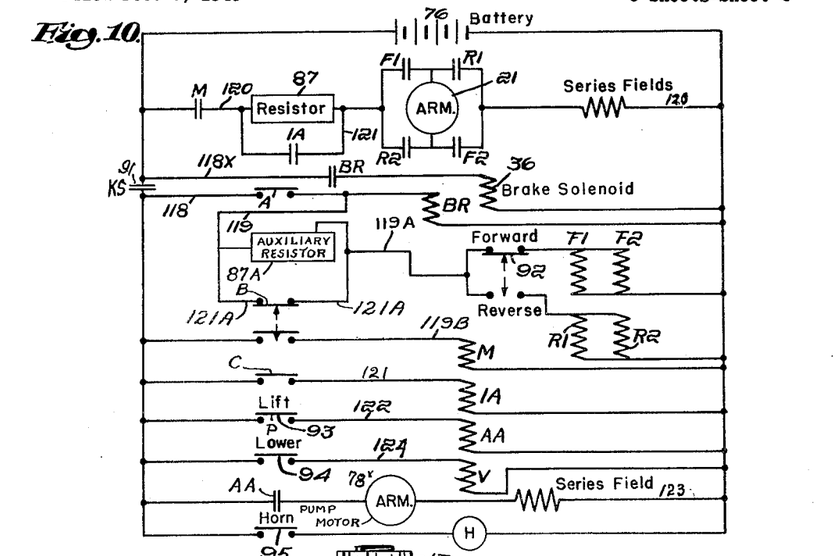

Diagrammatic illustration of the electric circuits for the power currents and controlling currents therefor containing the switches in the switch box and the coils of the relays are shown in Fig. 10 in which the upper section of the diagram illustrates the power circuits and the lower portion thereof illustrates the controlling circuits and switches therefor.

For convenience in describing the operation of the mechanisms the following nomenclature is used in Fig. 10.

A—Control switch for brake contactor and directional contactors.
B—Control switch for auxiliary resistor and main contactor.
C—Control switch for accelerating contactor.
92—Directional toggle switch.
93—Lifting control switch for pump contactor.
94—Lowering control switch for solenoid valve contactor.
95—Horn control switch.
M—Main contactor.
1A—Accelerating contactor.
AA—Pump contactor for hydraulic lift.
V—Solenoid valve contactor for hydraulic release.
BR—Brake contactor.
KS—Key switch.
F1—F2—Forward contactors.
R1—R2—Reverse contactors, it being understood that the contactors F1—F2 and R1—R2 are respectively mechanically interlocked, so that when the forward contactors F1—F2 are actuated the reverse contactors R1—R2 are inoperative and conversely when the reverse contactors R1—R2 are actuated the forward contactors F1—F2 will be inoperative.

The controlling circuits are all supplied through a key switch which is closed only when the truck is in service, this being designated as KS.

Operation of the brake releasing mechanism and control of the two speeds (low and high) of the traction wheel are effected through the group of three switches A, B and C.

Their operation is as follows:

Initial compression of the lever 108 or 116 by the grip of the hand of the operator mechanically closes the switch A thereby energizing the coil of the brake contactor BR, thus releasing the brake. Closing of switch A also closes the circuit 119 which for the moment is shunted around auxiliary resistor 87A through normally closed switch B to reversing switch 92 in the switch box 44 on the end of the steering tongue and the operating coils of the forward F1—F2 or reverse R1—R2 contactors in the armature circuit of the traction motor, for completion of the motor circuit thereafter by the closing of the main contactor M. When switch B is opened to break the shunt around auxiliary resistor 87A, the current in circuit 119 must then flow through the auxiliary resistor 87A. This current is insufficient to cause the initial closing of contactors F1—F2 or R1—R2, but is sufficient to maintain them closed which was accomplished by the greater current that flowed through the shunt 121A.

Further depression of the lever 108 or 116 by the grip of the operator beyond that required to close the energizing contactor A shifts switch B to break the shunt in circuit 119 and close circuit 119B thereby to close the main contactor M to complete the power circuit 120 and thereby to start the traction motor and drive the traction wheel at a slow speed in the direction designated by the setting of the reverse switch 92. Contactor 1A is still open and current flows through resistor 87.

The auxiliary "anti-plugging resistor" 87A serves two functions, first, it prevents the reversal of the traction motor if the directional control toggle switch 92 is changed in position while the truck is in either low or high speed. In either of the latter two positions the control switch B has been operated to open the shunt in circuit 119 so that the anti-plugging resistor is in series with the operating coils F1—F2 or R1—R2. Movement of the toggle switch 92 from forward to reverse or vice versa momentarily breaks the circuit permitting the previously energized contactors to open. The current is limited however by the anti-plugging resistor 87A to a value at which the other contactor will not pick up. Accordingly, the circuit to the traction motor is disconnected and the traction motor cannot be started without first releasing the lever 108 to completely cut off position or to an initial position with the energizing contactor only closed. This anti-plugging feature has the following advantages:

*a*—It protects the traction motor from high transient currents which might otherwise occur:

*b*—It protects the truck itself from mechanical stresses which might result from rapid change in direction;

*c*—it also protects the load against too sudden deceleration or acceleration;

*d*.—A further function of the anti-plugging resistor is to limt the rate of acceleraton through passing too rapidly through the slow speed position. Unless a slight hesitation is permitted following the closing of switch A the shunt around the anti-plugging resistor is removed before the contactor F1—F2 or R1—R2 has had time to close and accordingly the truck will not start. In other words, switch B should not be actuated until the directional contactors have had time to close.

Still further movement of the lever 108 by the grip of the operator closes the accelerating control switch C thereby energizing operating coil of contactor 1A to shunt the auxiliary low speed and starting resistor 87 and completing the circuit to drive the traction motor at high speed. The other control circuits include the following:

A simple push-button type of switch 93 in the switch box which serves to energize the operating coil of the contactor AA (see Fig. 2) to complete the power circuit to the pump actuating motor for raising the load supporting means;

A simple push-button switch 94 which operates the solenoid type of hydraulic valve V (see Fig. 2) for releasing the fluid under pressure supplied to the hydraulic jack to permit the descent of the load supporting means;

A push-button switch for completing the circuit to the horn or other signaling device.

The mechanisms as above and as heretofore described are located on the truck as follows:

The battery, pump motor unit for raising the load supporting means and the lowering valve V for releasing fluid pressure from the hydraulic jack are mounted on the frame; the traction motor, braking mechanism including the brake solenoid, the resistors and the relays are mounted upon the steering wheel assembly; the key switch and all controlling switches in the switch box upon the free end of the steering tongue and the hand grip extending horizontally therefrom.

Assuming that the truck is stationary and the load supporting means in lowered position, the operator first places the key in the switch 91KS (which preferably is the pin locking type of the well known "Yale" lock) then turns the lock to permit the flow of the controlling currents through the respective switches. The operator then depresses the arm 110, or 116, first causing the cam 102 to engage the resilient switch arm 99 to actuate control switch A. This completes the controlling circuit 118 to BR (brake contactor) causing the latter to complete the power circuit 118x through the brake actuating solenoid to release the brake, and also energizes circuit 119, through which current passes by way of circuit 121A, which through the normally closed contact of control switch B shunts auxiliary resistor 87A, to circuit 119A, and toggle selector switch 92, and directional contactor F1—F2 or R—R2. The closing of either of the latter contactors (as selected by position of toggle switch 92) conditions the power circuit 120, through resistor 87, the armature and the series field of the traction motor.

Further depression of the arm 110 or 116 causes the cam 103 to engage the resilient switch arm 100 to actuate control switch B, thereby opening circuit 121A shunting auxiliary resistor 87A, and completing circuit 119B to the operating coil of main contactor M. Closing of main contactor M completes the power circuit through the driving motor to propel the truck in low speed in accordance with the setting of the reversing switch 92.

Further depression of lever arms 110 or 116 will cause cam 104 to engage resilient switch arm 101 to actuate control switch C, engaging 1A (accelerating contactor), thereby to complete a shunt circuit 121 around the resistor 87 and cause the motor to run at full voltage and consequently drive the truck at a maximum speed.

Conversely the operator may, by progressively releasing the pressure upon the lever 110, or 116, break the shunt circuit to reduce the speed at which the truck is driven and upon full release of pressure release the energizing contactor and the brake release BR thereby permitting the spring 32 (Fig. 8) to clamp the brake shoes 27 upon the brake drum and arrest the forward or rearward movement of the truck as the case may be.

By reason of the construction above described the manipulation of the truck can be controlled by the operator when the tongue is in any steering position or in any position to which it may be swung horizontally or in any position to which it may be swung vertically including vertical position, the tongue being held in any such position by the counterbalancing spring 50.

In the usual operation of elevating trucks the truck is steered rearwardly to insert its load supporting means beneath a skid or a pallet upon which the load is mounted. In order to raise the load supporting means the operator is required to release his hands from engagement with the tongue and move to a different position in which he can manipulate a lever or other means for actuating mechanism for elevating or lowering the load supporting means.

In the present invention the switch mechanism in the switch box, which is mounted upon the end of the tongue, comprises means not only for controlling the transportation of the truck, but also for controlling the raising and lowering of the truck so that the operator without moving from the position in which he stands can raise the load supporting means to load the truck or lower it to deposit the load. It also enables the operator while transporting the truck to avoid engagement of a high load with the top of a low doorway or other obstruction or if for any reason the truck should acquire an unreasonable speed while passing down a steep ramp the load can be instantly lowered to cause the legs of the skid to engage the ramp and break the speed of the truck.

The raising of the load supporting means is accomplished by depressing the push button 93 to complete a controlling circuit leading through the conductor 122 which is detachably connected to a terminal in the terminal panel and therefrom to a suitable reday AA (Fig. 2) which may be mounted upon the pump actuating motor 78x and thereby cause the completion of the power circuit 123 to the series field of the pump actuating motor 78x thereby to supply fluid under pressure to the hydraulic jacks 54 Fig. 1, or to the jacks 69 Fig. 3, as the case may be.

When it is desired to lower the load the operator will press the push button 94 in the switch box 44 thereby completing a controlling circuit 124 through a conductor which is detachably connected to a terminal of the terminal board and therefrom to the solenoid 79x, for actuating the valve which is designated as V (solenoid valve).

The switch box 44 is also provided with a push button 95 which when pressed will complete a similar circuit through the conductor which is detachably connected to the terminal board and from said board to a horn H or other signaling device which may be located at any convenient place upon the truck.

By reason of the present invention all the operations of the truck mechanisms are always under the control of the operator while still grasping or in a position to grasp the gripping members of the tongue thereby greatly reducing the efforts imposed upon the operator in loading and unloading the truck and transporting the truck and also enabling loads to be more rapidly moved from one position to another.

It will be understood that the particular embodiments of the invention disclosed herein are of an illustrative character and that various modifications in construction and arrangement of parts may be made within the spirit and scope of the following claims.

Having thus described the invention, what is claimed as new, and desired to be secured by Letters Patent, is:

1. A power driven truck having a main frame, a battery mounted thereon, a reversible electric motor and means operable thereby to drive the truck, a normally applied brake therefor and electrically operable brake releasing mechanism, a steering wheel assembly comprising a steering head having a vertical tubular steering post journaled centrally in the front portion of said frame, and a tubular steering tongue mounted on said head to swing vertically having on its free end a switch box and hand grips extending horizontally from said tongue, conductors for power currents extending from the battery through the tubular steering post to the brake releasing means and to the reversible motor including means therein to cause the motor to drive the truck at a low or high speed, said conductors being connected to relays mounted on the steering head assembly, and controlling circuits from the relays through the tubular steering tongue, switches in said switch box for the respective relay controlling circuits including a reversing switch selectively operable by the operator when the steering tongue is in any vertical or horizontal position to control the operation of the respective relay controlling circuits.

2. A power driven truck as defined in claim 1, in which the tubular steering post is detachably connected to the main frame and in which the conductors for the power currents and the relay controlling currents are detachably connected to their respective relays, whereby the steering head assembly can be readily removed for repair or replacement.

3. A power driven truck having a main frame provided at its front end with a vertical standard having a forward extension, a battery mounted on said main frame, a steering wheel assembly having a head provided with a vertical tubular steering post journaled centrally in said extension, said head having mounted upon it a vertically movable tubular steering tongue having at its free end a switch box provided with horizontally extending hand grips, a reversible electric motor, means operable thereby to drive the traction wheel, normally applied braking mechanism therefor and electrically operating brake-releasing means; conductors for power currents respectively extending from the battery through the tubular steering post to the brake releasing mechanism and to the reversible motor for driving the traction wheel at a low or high speed having therein relays mounted on the steering head assembly, conductors for relay controlling currents extending from the battery through the tubular steering post to the respective relays and from the relays through the tubular steering tongue, switches in said switch box for the respective relay controlling currents including a reversing switch selectively operable by the operator while grasping a hand grip when the tongue is in any vertical or horizontal position to control the operation of the respective relay controlling circuits.

4. A power driven truck having a wheel-supported steering head rotatable about a vertical axis, an electric motor and an electrically operable brake therefor mounted on said steering head and means operable by said motor to drive the steering wheel, a source of electricity mounted on said truck, electric circuits therefrom leading to said motor, and brake, a steering tongue pivotally mounted on said steering head to swing vertically, a switch box mounted upon the end of said tongue having laterally extending hand grips, switch mechanisms mounted in said switch box for controlling said electric circuits including a reversible switch to cause the motor selectively to rotate the steering wheels in a direction to drive the truck forwardly or in the reverse direction, a lever pivotally mounted in one of said hand grips, and switches in said switch box operable by depressing said lever by the grip of the operator first to cause the release of the brake mechanism and thereafter to control the speed of the steering wheel actuating motor.

5. A power driven truck having a wheel-supported steering head rotatable about a vertical axis, an electric motor and an electrically operable brake therefor mounted on said steering head and means operable by said motor to drive the steering wheel, a source of electricity mounted on said truck, electric circuits therefrom leading to said motor and brake, a steering tongue pivotally mounted on said steering head to swing vertically, a switch box mounted upon the end of said tongue having laterally extending hand grips, switch mechanisms mounted in said switch box for controlling said electric circuits including a reversible switch to cause the motor selectively to rotate the steering wheels in a direction to drive the truck forwardly or in the reverse direction, levers pivotally mounted in the respective hand grips flexibly interconnected at their inner ends and switches in said switch box operable by depressing either of the levers by the grip of the operator first to cause the release of the brake mechanism and thereafter to control the speed of the steering wheel actuating motor.

6. A power driven truck having a main frame provided at its front end with a vertical standard having a forward extension, a steering head assembly comprising a vertical tubular steering post rotatably and detachably mounted in said extension and provided with a traction wheel and an electrically operable motor for driving it, and a vertically movable swinging tongue, a storage battery mounted on said main frame, electric conductors respectively for transmitting power currents to said motor and for controlling circuits for the respective power currents extending from said battery through said tubular steering post, detachable terminal connections for the respective conductors mounted on said steering head assembly, conductors leading respectively from said terminal connections to the motor, switch mechanism mounted on the end of said tongue and conductors for said controlling currents extending from said terminals through the tubular tongue to said switch mechanism, whereby by detaching the steering post and the respective conductors for the power currents and the conductors for the controlling currents from said terminals the steering assembly can be removed as a unit for service or replacement.

7. A power driven truck having a main frame provided at its front end with a vertical standard having a forward extension, a steering head assembly comprising a vertical tubular steering post projecting through said extension and having an externally screw threaded end, a nut mounted on said screw threaded end, said steering head assembly having a traction wheel and an electrically operable motor for driving it, an electrically operable brake for said motor, and a vertically movable swinging tongue, a storage battery mounted on said main frame, electric conductors respectively for transmitting power currents to said motor and for controlling circuits for said power currents extending from said battery through said tubular steering post, detachable terminal connections for the respective conductors mounted on said steering head assembly, conductors leading respectively from said terminal connections to the motor and brake, switch mechanism mounted on the end of said tongue and conductors for said controlling currents extending from said terminals through the tubular tongue to said switch mechanism, whereby by removing the nut upon the steering post and detaching said terminals the steering assembly may be removed as a unit for service or replacement.

8. A power driven truck having a main frame provided at its front end with a vertical standard having a forward extension, a steering head assembly comprising a vertical tubular steering post rotatably and detachably mounted in said extension and provided with a traction wheel and an electrically operable motor for driving it, and a vertically movable swinging tongue, a storage battery mounted on said main frame, electric conductors respectively for transmitting power currents to said motor and for controlling circuits for the respective power currents extending from said battery through said tubular steering post, a casing secured to and forming part of said steering assembly having mounted thereon relays for the respective controlling circuits, a terminal panel having a series of upper and lower banks of pairs of terminals for the respective power circuits, the terminals of the upper bank being detachably connected to the controlling circuits, relays mounted on said casing being respectively connected to one of the terminals of each pair and conductors from the relays connected to the other terminal of such pair, and conductors detachably connected to the respective pairs of terminals leading therefrom through the tubular tongue to switch mechanism mounted thereon, whereby by detaching the steering post and the respective conductors for the power currents and the conductors for the controlling currents leading from said terminals the steering assembly can be removed as a unit for service or replacement.

9. A power driven truck having a main frame, a source of electric current carried by said frame, a steering wheel assembly comprising a steering head having a vertical, oscillatable, tubular connection with said frame, an electric motor and means operable thereby to drive the truck carried by said steering head, continuous electrical conductors extending through said tubular connection for transmitting electric current from said source of electric current to said motor, said conductors fixed at least at one point with respect to said frame and at least at one point with respect to said steering head, said conductors having sufficient flexibility to twist whatever degree is required upon oscillation of said steering head, a steering tongue mounted on said steering head to swing vertically and having thereon switches, auxiliary conductors extending from said first named conductors along said steering tongue to said switches, actuation of the said switches setting up circuits in said auxiliary conductors for controlling the operation of said motor.

10. A power driven truck having a main frame, a source of electric current carried by said frame, a steering wheel assembly comprising a steering head having a vertical, oscillatable, tubular connection with said frame, an electric motor and means operable thereby to drive the truck carried by said steering head, electrically operated load lifting and lowering means on the main frame, continuous electrical conductors extending through said tubular connection for transmitting electric current from said source of electric current to said motor and from said source of electric current to said electrically operated load lifting and lowering means, said conductors fixed at least at one point with respect to said frame and at least at one point with respect to said steering head, said conductors having sufficient flexibility to twist whatever degree is required upon oscillation of said steering head, a steering tongue mounted on said steering head to swing vertically and having thereon switches, auxiliary conductors extending from said first named conductors along said steering tongue to said switches, actuation of the said switches setting up circuits in said auxiliary conductors for controlling the operation of said motor and of said electrically operated load lifting and lowering means.

11. A power driven truck as defined in claim 9 including contactors for opening and closing the circuits from the source of electric current to the motor, the operation of said contactors being controlled by the said actuation of the switches carried by the steering tongue.

12. A power driven truck as defined in claim 11 in which the said contactors are mounted on the steering head.

13. A power driven truck as defined in claim 10 including contactors for opening and closing the circuits from the source of electric current to the motor and from the source of electric current to said electrically operated load lifting and lowering means, the operation of said contactors being controlled by the said actuation of the switches carried by the steering tongue.

14. A power driven truck as defined in claim 9 and including in addition a normally applied brake for said electric motor and electrical operable brake releasing mechanism controlled by a switch on said steering tongue.

15. A power driven truck having a main frame, a battery mounted thereon, a steering wheel assembly comprising a steering head having a vertical, tubular steering post journaled centrally in the front portion of said frame and a reversible electric motor and means operable thereby to drive the truck and a normally applied brake therefor and electrically operable brake releasing mechanism, a tubular steering tongue mounted on said head to swing vertically, conductors for power currents extending from the battery through the tubular steering post to the brake releasing means and to the reversible motor, means for causing the motor to drive the truck at low and high speed, relays mounted on the steering head assembly and connected to controlling conductors extending from the relays through the tubular steering tongue, and switches, including a reversing switch, on the free end of said tongue, said switches selectively operable by the operator when the steering tongue is in any vertical or horizontal position to control the operation of the respective relay controlling conductors.

16. A power driven truck having a main frame, a battery mounted thereon, electrically operated load lifting and lowering means on the said main frame, a steering wheel assembly comprising a steering head having a vertical tubular steering post journaled centrally in the front portion of said frame and a reversible electric motor and means operable thereby to drive the truck and a normally applied brake therefor and electrically operable brake releasing mechanism, a tubular steering tongue mounted on said head to swing vertically, conductors for power currents extending from the battery through the tubular steering post to the said electrically operated load lifting and lowering means and to the reversible motor and to the brake releasing means, means for causing the motor to drive the truck at low and high speed, relays mounted on the steering head assembly and connected to controlling conductors extending from the relays through the tubular steering tongue, and switches, including a reversing switch, on the free end of said tongue, said switches selectively operable by the operator when the steering tongue is in any vertical or horizontal position to control the operation of the respective relay controlling conductors.

17. A steering tongue for use with a power-driven truck in which said truck has a steering wheel assembly that includes a steering head and a steering wheel driven by an electric motor and to which assembly said tongue is pivotally affixed for the purpose of guiding said assembly and providing a carrier for controlling means for said motor, said tongue having a laterally extending grip with an arm extending from the side of said grip and generally parallel to the long dimension of said grip, said arm being movable by the hand of the operator inwardly of said grip, a plurality of controlling members carried by said tongue and means operable by inward movement of said arm for causing sequential operation of said controlling members.

ALBERT H. GFRORER.

REFERENCES CITED

The following references are of record in the file of this patent:

UNITED STATES PATENTS

| Number | Name | Date |
| --- | --- | --- |
| 1,527,431 | Gumpper | Feb. 24, 1925 |
| 1,540,170 | Frick | June 2, 1925 |
| 2,254,331 | Stuebing, Jr. | Sept. 2, 1941 |
| 2,329,215 | Paulus | Sept. 14, 1943 |
| 2,395,345 | Schreck | Feb. 19, 1946 |
| 2,399,605 | Schroeder | Apr. 30, 1946 |
| 3,417,018 | Schroeder | Mar. 4, 1947 |